United States Patent
Vacca et al.

(10) Patent No.: US 9,764,671 B2
(45) Date of Patent: Sep. 19, 2017

(54) UNLOADING RELIEF VALVE

(71) Applicant: Caterpillar Inc., Peoria, IL (US)

(72) Inventors: John Cody Vacca, Joliet, IL (US); Bala Natarajan Balashanmugam, Plainfiled, IL (US); Partiban Chengalvarayan, Kottivakkam Chennai (IN); Daniel T. Mather, Lockport, IL (US); Carl Andrew McIlheran, Channahon, IL (US); Thomas Dale Morris, Minooka, IL (US)

(73) Assignee: Caterpillar Inc., Peoria, IL (US)

( * ) Notice: Subject to any disclaimer, the term of this patent is extended or adjusted under 35 U.S.C. 154(b) by 42 days.

(21) Appl. No.: 14/706,716

(22) Filed: May 7, 2015

(65) Prior Publication Data
US 2016/0327110 A1  Nov. 10, 2016

(51) Int. Cl.
*F16K 15/18* (2006.01)
*B60P 1/16* (2006.01)

(52) U.S. Cl.
CPC .............. *B60P 1/162* (2013.01); *F16K 15/18* (2013.01)

(58) Field of Classification Search
CPC .. B60P 1/16; B60P 1/162; F16D 65/78; F16K 15/063; F16K 15/186; F16K 31/122; F16K 31/1221
See application file for complete search history.

(56) References Cited

U.S. PATENT DOCUMENTS

| | | | |
|---|---|---|---|
| 2,429,578 A * | 10/1947 | Gleasman | F16K 15/063 |
| | | | 137/538 |
| 3,882,930 A | 5/1975 | Schexnayder | |
| 4,271,937 A | 6/1981 | Hatch et al. | |
| 5,322,147 A | 6/1994 | Clemens | |
| 7,845,471 B2 | 12/2010 | Bares et al. | |
| 2003/0052293 A1 * | 3/2003 | Enzaki | F16K 41/10 |
| | | | 251/291 |
| 2011/0278488 A1 * | 11/2011 | Feser | F16K 27/02 |
| | | | 251/324 |
| 2016/0230906 A1 * | 8/2016 | Tanikawa | F16K 31/1221 |

* cited by examiner

*Primary Examiner* — Anna Momper
(74) *Attorney, Agent, or Firm* — Miller, Matthias & Hull LLP

(57) ABSTRACT

A valve for a brake cooling system may include a body including a first and a second end, a first at least one radial passage, and a second at least one radial passage fluidly communicable with the first end. A first seat may be disposed within the body proximate the first end, while a plug may include a stop, a collar, and a first trunk disposed between the stop and the collar. The collar and the first trunk may be disposed in the body while an adapter may include a second seat, a head, and a second trunk disposed between the second seat and the head. The second seat and the second trunk may be disposed in the plug with a chamber, fluidly communicable with the adapter and the first at least one radial passage, being defined in the first trunk of the plug. An actuator may be slidably disposed in the chamber, and be in operative association with a biasing member. A poppet may be in operative association with the biasing member and the first seat.

15 Claims, 7 Drawing Sheets

UNLOADING RELIEF VALVE

TECHNICAL FIELD

The present disclosure relates generally to hydraulic braking systems for a vehicle and, more particularly, to valves for a brake cooling circuit of such hydraulic braking systems.

BACKGROUND

Many work machines in the earth-moving and agricultural industries such as, for example, large mining trucks and large off-highway trucks, may include hydraulic braking systems that are associated with hydraulic hoist systems. In such work machines, a hoist valve of the hydraulic hoist system may be in fluid communication with a brake cooling circuit of the hydraulic braking system. In some arrangements, the hoist valve may provide a fluid path to the brake cooling circuit so that the hydraulic fluid may cool the braking system of the work machine. During a hoist raise command, the fluid flow from the rod end of the hoist valve may be dumped to the brake cooling circuit. While such an arrangement is effective for cooling the brake pads, the brake cooling circuit may experience transient pressure spikes such as those caused by the large fluid flow from the rod end of the hoist valve to the brake cooling circuit when the hoist valve is commanded to be in the raised position. These transient pressure spikes may compromise the duo cone seals in the brake cooling circuit causing an external leak point for the hydraulic fluid to the rear axle of the work machine.

U.S. Pat. No. 4,271,937 (the '937 patent) discloses valves for hydraulic brakes. While the '937 patent teaches a valve that may provide a flow path in a brake cooling circuit to cool hydraulically-operable rotary friction brakes, it fails to teach a valve in association with a hydraulic hoist system and, thus, also fails to teach a valve that reduces or eliminates transient pressure spikes resulting from large fluid flow changes to the brake cooling circuit such as those transient pressure spikes caused when a hoist valve of the hydraulic hoist system is commanded to be in a raised position.

SUMMARY

In accordance with an aspect of the disclosure, a valve for a brake cooling system may include a body including a first and a second end, a first at least one radial passage, and a second at least one radial passage fluidly communicable with the first end. A first seat may be disposed with the body proximate the first end, while a plug may include a stop, a collar, and a first trunk disposed between the stop and the collar. The collar and the first trunk may be disposed in the body while an adapter may include a second seat, a head, and a second trunk disposed between the second seat and the head. The second seat and the second trunk may be disposed in the plug with a chamber, fluidly communicable with the adapter and the first at least one radial passage, being defined in the first trunk of the plug. An actuator may be slidably disposed in the chamber, and be in operative association with a biasing member. A poppet may be in operative association with the biasing member and the first seat.

In accordance with another aspect of the disclosure, a work machine is provided. The work machine may include a carrier actuator including a rod end and a head end. The work machine may also include a valve including a body with a first end, a second end, a first at least one radial passage, and a second at least one radial passage fluidly communicable with the first end. The first end may be fluidly communicable with the rod end. A first seat may be disposed with the body proximate the first end, while a plug may include a stop, a collar, and a first trunk disposed between the stop and the collar. The collar and the first trunk may be disposed in the body while an adapter including a second seat, a head, and a second trunk disposed between the second seat and the head. The second seat and the second trunk may be disposed in the plug with a chamber, fluidly communicable with the adapter and the first at least one radial passage, being defined in the first trunk of the plug. An unloading actuator may be slidably disposed in the chamber, and be in operative association with a biasing member. A poppet may be in operative association with the biasing member and the first seat. A check valve may be disposed in the adapter and fluidly communicable with the head end.

In accordance with yet another aspect of the disclosure, a sample sequence of steps which may be performed to prevent transient pressure spikes into a brake cooling system of a work machine is provided. The sample sequence of steps may entail providing an unloading relief valve between a hoist valve and a brake cooling system of the work machine. Another step may be arranging the unloading relief valve to operate in a brake cooling relief mode, when a pilot pressure from a head end of a carrier actuator via the hoist valve is not applied to the unloading relief valve, such that fluid from a rod end of the carrier actuator via the hoist valve flows to the brake cooling system. Yet another step may be arranging the unloading relief valve to operate in an unloading mode, when the pilot pressure from the head end of the carrier actuator via the hoist valve is applied to the unloading relief valve, such that the fluid from the rod end of the carrier actuator via the hoist valve flows to a tank.

DETAILED DESCRIPTION

The present disclosure provides systems and methods for preventing transient pressure spikes into a brake cooling system of a work machine. Such systems and methods may provide a valve capable of operating in a brake cooling relief mode and an unloading mode to prevent such pressure spikes into the brake cooling system. The valve may also slowly transition from the unloading mode back to the brake cooling relief mode in a controlled manner to prevent a new pressure from being introduced into the brake cooling system.

Figure 1:
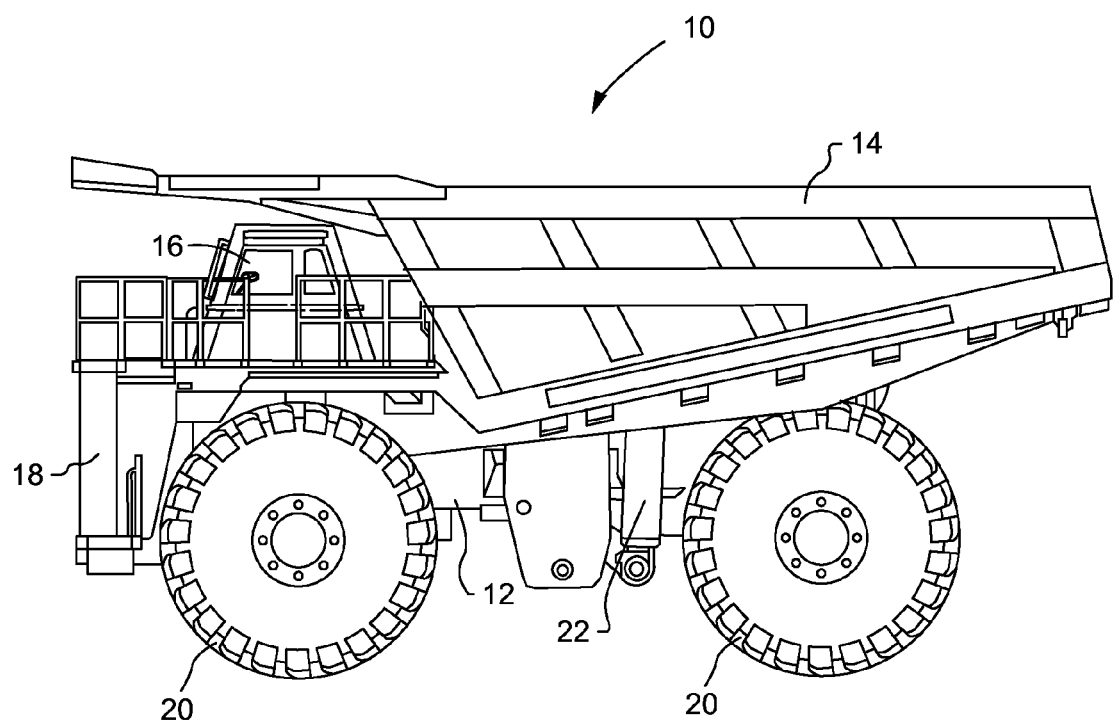
FIG. 1 is a side view of an exemplary work machine in accordance with the teachings of the present disclosure.

Referring now to FIG. 1, an exemplary work machine constructed in accordance with the present disclosure is generally referred to by reference numeral 10. The work machine 10 may be any type of work machine well known in the earth-moving and agricultural industries such as, but not limited to, large mining trucks and large off-highway trucks. The work machine 10 may include a frame 12. The work machine 10 may also include a payload carrier 14, which may be pivotally coupled to the frame 12. An operator cab 16 may be coupled to the frame 12 via an engine enclosure 18 that is disposed on the frame 12 such that the operator cab 16 may sit above the engine enclosure 18. The engine enclosure 18 may house one or more prime movers (not shown) such as, but not limited to, an internal combustion engine, a natural gas engine, a hybrid engine, or any combination thereof. Further, the work machine 10 may be supported on the ground by a plurality of wheels 20. The one or more prime movers may supply power to the plurality of wheels 20.

The payload carrier 14 may carry variable amounts of payload, which may need to be dumped from the work machine 10 during a dump cycle. As such, a carrier actuator 22 may be attached to the payload carrier 14 in a manner that effectuates movement of the payload carrier 14 to dump the payload. As an example, the carrier actuator 22 may be, but is not limited to, hydraulic cylinders.

Figure 2:
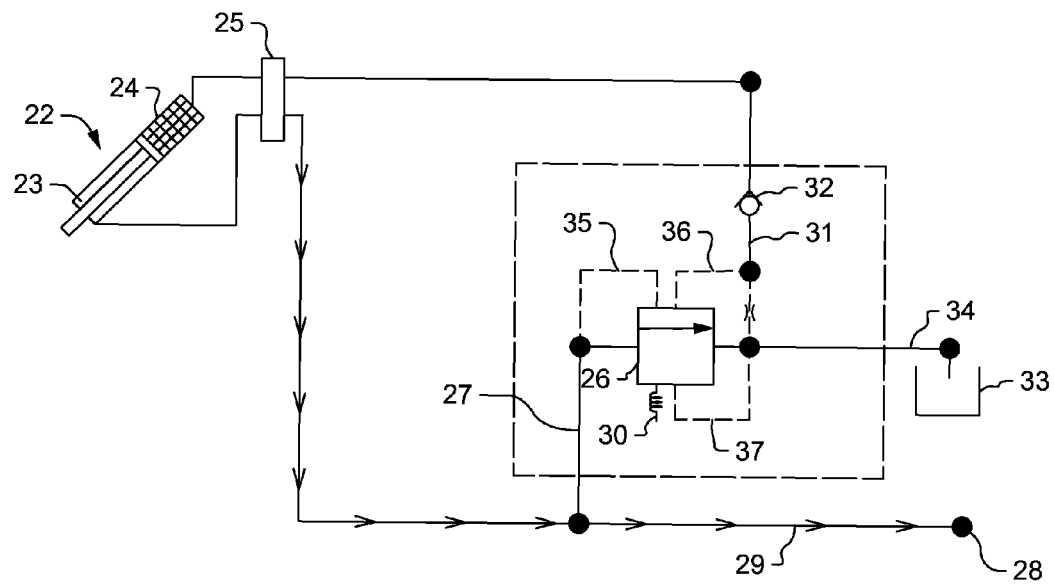
FIG. 2 is a schematic diagram illustrating a hydraulic flow path when an unloading relief valve is in a brake cooling relief mode, in accordance with the teachings of the present disclosure.

As best seen in FIG. 2, the carrier actuator 22 includes a rod end 23 and a head end 24. The rod end 23 may be in fluid communication, via a hoist valve 25, with an unloading relief valve 26 via a first hydraulic line 27 and a brake cooling system 28 of the work machine 10 via a brake cooling line 29. The unloading relief valve 26 may include a biasing member 30, which may be, but is not limited to, a coil spring. The unloading relief valve 26 may be in fluid communication with the head end 24 via a second hydraulic line 31 that may include a check valve 32. The unloading relief valve 26 may also be in fluid communication with a tank 33 via a tank line 34. A first signal pressure line 35 may communicate the pressure of the first hydraulic line 27 to the unloading relief valve 26. The second hydraulic line 31 may be in fluid communication with the unloading relief valve 26 via a second signal pressure line 36. A third signal pressure line 37 may communicate a pressure of the tank line 34 to the unloading relief valve 26. It is to be understood that for the sake of simplicity only component elements that are relevant to the current disclosure are illustrated and other common elements may be left out.

Figure 3:
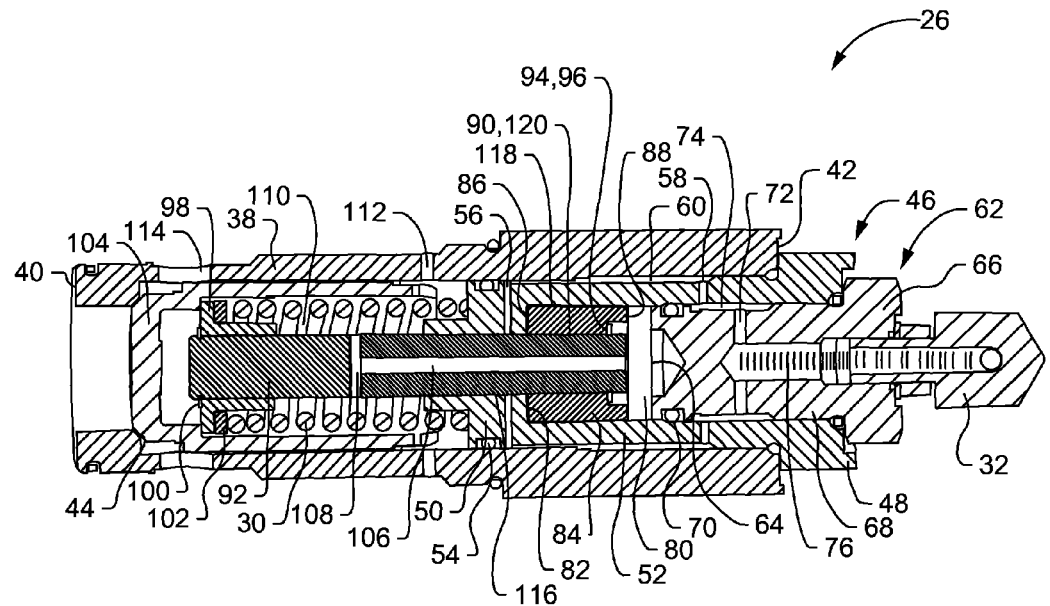
FIG. 3 is a sectional view of the unloading relief valve of FIG. 2 in accordance with the teachings of the present disclosure.

FIG. 3 illustrates an exemplary unloading relief valve 26, which may be utilized in the schematic diagram of FIG. 2. The unloading relief valve 26 may include a hollow body 38 having a poppet end 40 and a plug end 42. The body 38 may be substantially cylindrical in shape. A poppet seat 44 may be disposed within the body 38 proximate the poppet end 40.

The unloading relief valve 26 may also include a plug 46. The plug 46 may include a stop portion 48, a collar portion 50, and a trunk portion 52 disposed therebetween. A collar O-ring 54 may circumscribe the exterior of the collar portion 50. The trunk portion 52 may include at least one radial actuating passage 56 proximate the collar portion 50 and at least one radial trunk passage 58 spaced apart from the at least one actuating passage 56. The plug end 42 of the body 38 may sealingly receive the plug 46 in a manner such that the collar portion 50 and the trunk portion 52 may both be disposed within the body 38 while the stop portion 48 remains external of the body 38 such that it may sealingly abut the exterior of the plug end 42. In this manner, the collar O-ring 54 may sealingly engage the interior of the body 38. An axial trunk passage 60 may be defined between the trunk portion 52, approximately between the at least one radial actuating passage 56 and the at least one radial trunk passage 58, and the interior of the body 38 so that the at least one radial actuating passage 56 may be in fluid communication with the at least one radial trunk passage 58.

Further, the unloading relief valve 26 may also include an adapter 62. The adapter 62 may include an actuator seat 64, an adapter head 66, and an adapter trunk 68 disposed therebetween. An adapter O-ring 70 may circumscribe the exterior of the actuator seat 64. The adapter trunk 68 may include at least one radial adapter passage 72. The stop portion 48 of the plug 46 may sealingly receive the adapter 62 in a manner such that the actuator seat 64 and the adapter trunk 68 may both be disposed within the plug 46 while the adapter head 66 remains external of the plug 46 such that it may securely abut the exterior of the stop portion 48. In this manner, the adapter O-ring 70 may sealingly engage the interior of the trunk portion 52 of the plug 46. An axial plug passage 74 may be defined between the interior of the trunk portion 52 of the plug 46 and the adapter trunk 68 so that the at least one radial adapter passage 72 may be in fluid communication with the at least one radial trunk passage 58. The adapter 62 may also include an axial adapter passage 76, which may penetrate through the adapter head 66. The adapter head 66 may sealingly receive the check valve 32 through the axial adapter passage 76. Alternatively, the check valve 32 may be integrated in the adapter head 66. The axial adapter passage 76 may fluidly couple the at least one radial adapter passage 72 to the check valve 32.

The actuator seat 64 may be disposed within the plug 46 such that an actuator chamber 80 may be defined, in the trunk portion 52 of the plug 46, between the actuator seat 64 and a wall 82 that forms part of the at least one radial actuating passage 56. A unloading actuator 84 may be slidably disposed within the actuator chamber 80. The unloading actuator 84 may include a wall side 86 that faces the wall 82 and a seat side 88 that faces the actuator seat 64.

The actuator chamber 80 may be in fluid communication with the at least one actuating passage 56 via at least one wall passage (not shown) in the wall 82. The unloading actuator 84 may also include a center bore 90 that penetrates through the wall side 86 and the seat side 88. The bore 90 may slidably receive a stem 92, which penetrates and extends through the wall 82 and the collar portion 50 of the plug 46. The stem 92 may include a snap ring 94 that is engageable with a snap ring seat 96 disposed on the unloading actuator 84. A retainer 98 may extend radially outwardly from the stem 92 in a section that is external of the plug 46 and on the opposite end from the snap ring 94. Retaining rings 100 may also extend radially outwardly from the stem 92 proximate the retainer 98. The retaining rings 100 may abut and support the retainer 98. The biasing member 30 may be disposed between the retainer 98 and the collar portion 50 of the plug 46. Shims and washers 102 may be disposed between the retainer 98 and the biasing member 30. The biasing member 30 may bias the retainer 98 against a poppet 104 so that the poppet 104 sealingly sits in operative engagement with the poppet seat 44 of the body 38. The poppet 104 may circumscribe the biasing member 30.

The stem 92 may include an axial stem passage 106 and at least one radial stem passage 108. The at least one radial stem passage 108 may be disposed in an area of the stem 92 that is exterior of the plug 46 so that the at least one radial stem passage 108 may be in fluid communication with a biasing member chamber 110, which contains the biasing member 30. The axial stem passage 106 may intersect the at least one radial stem passage 108 within the stem 92. Moreover, the body 38 may include a first at least one radial body passage 112 in fluid communication with the biasing member chamber 110. The body 38 may also include a second at least one radial body passage 114 proximate the poppet seat 44. The first and second at least one radial body passages 112, 114 may be in fluid communication with the tank 33.

As illustrated in FIG. 3, the unloading relief valve 26 is shown in a brake cooling relief mode. The arrowed lines of FIG. 2 illustrate the fluid flow path associated with the unloading relief valve 26 in the brake cooling relief mode of FIG. 3. In particular, in the brake cooling relief mode, pilot pressure from the head end 24 is not applied through the unloading relief valve 26 and, as a result, the wall side 86 of the unloading actuator 84 sits against the wall 82. Further, the biasing member 30 biases the poppet 104 into operative sealing engagement with the poppet seat 44 of the body 38. A portion of the hydraulic fluid flowing from the rod end 23 may flow up to the poppet 104. The pressure against the poppet 104, however, is not great enough to overcome the force of the biasing member 30 and the poppet 104 remains in operative sealing engagement with the poppet seat 44. The majority of the hydraulic fluid flowing from the rod end 23, on the other hand, flows to the brake cooling system 28 of the work machine 10.

Figure 4:
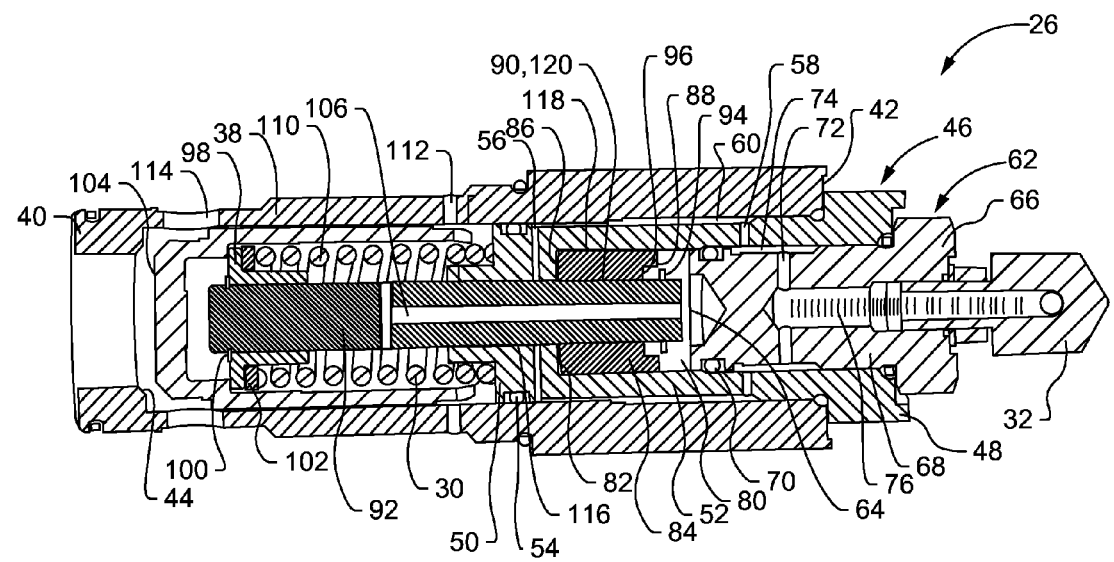
FIG. 4 is a sectional view of the unloading relief valve in a brake cooling relief mode with a pressure spike, in accordance with the teachings of the present disclosure.
Figure 5:
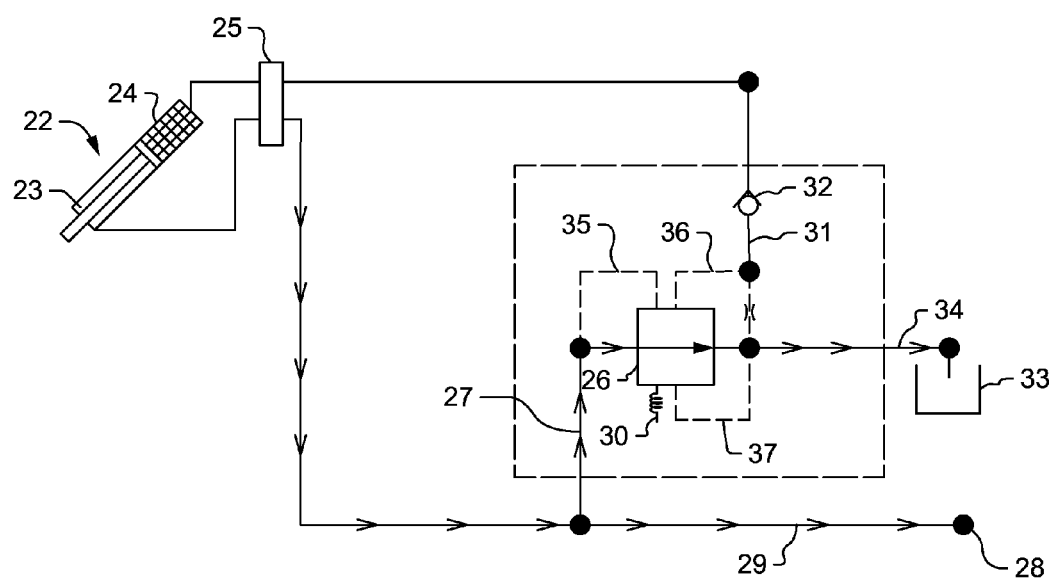
FIG. 5 is a schematic diagram illustrating the hydraulic flow path when the unloading relief valve is in the brake cooling relief mode with a pressure spike of FIG. 4, in accordance with the teachings of the present disclosure.

During the brake cooling relief mode, the unloading relief valve 26 may experience a transient pressure spike. FIG. 4 illustrates the unloading relief valve 26 in the brake cooling relief mode with a transient pressure spike. The arrowed lines of FIG. 5 illustrate the fluid flow path associated with unloading relief valve 26 depicted in FIG. 4. Similar to the brake cooling relief mode, in the brake cooling relief mode with a transient pressure spike, pilot pressure from the head end 24 is not applied through the unloading relief valve 26 and, as a result, the wall side 86 of the unloading actuator 84 remains seated against the wall 82. The transient pressure spike flows against the poppet 104 and forces the poppet 104 away from the poppet seat 44 against the retainer 98 to compress the biasing member 30. The force of the poppet 104 against the retainer 98 forces the stem 92 to slide within the collar portion 50 of the plug 46 and within the bore 90 of the unloading actuator 84 while the unloading actuator 84 remains seated against the wall 82. With poppet 104 unseated from the poppet seat 44, the transient pressure spike flows through the second at least one radial body passage 114 to the tank 33.

Figure 6:
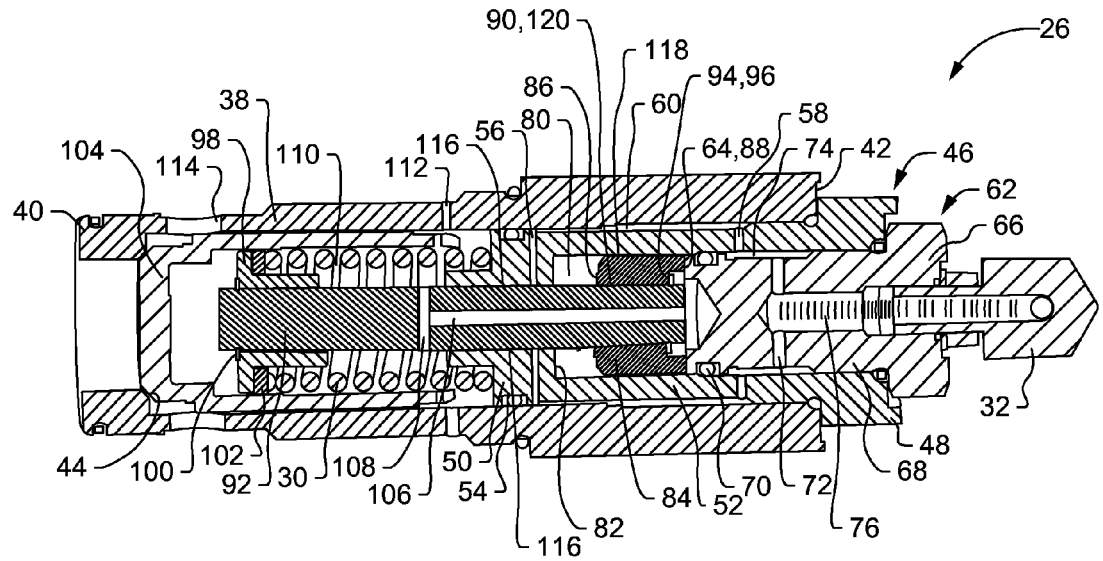
FIG. 6 is a sectional view of the unloading relief valve in an unloading mode without hoist valve rod end fluid flowing to the tank, in accordance with the teachings of the present disclosure.
Figure 7:
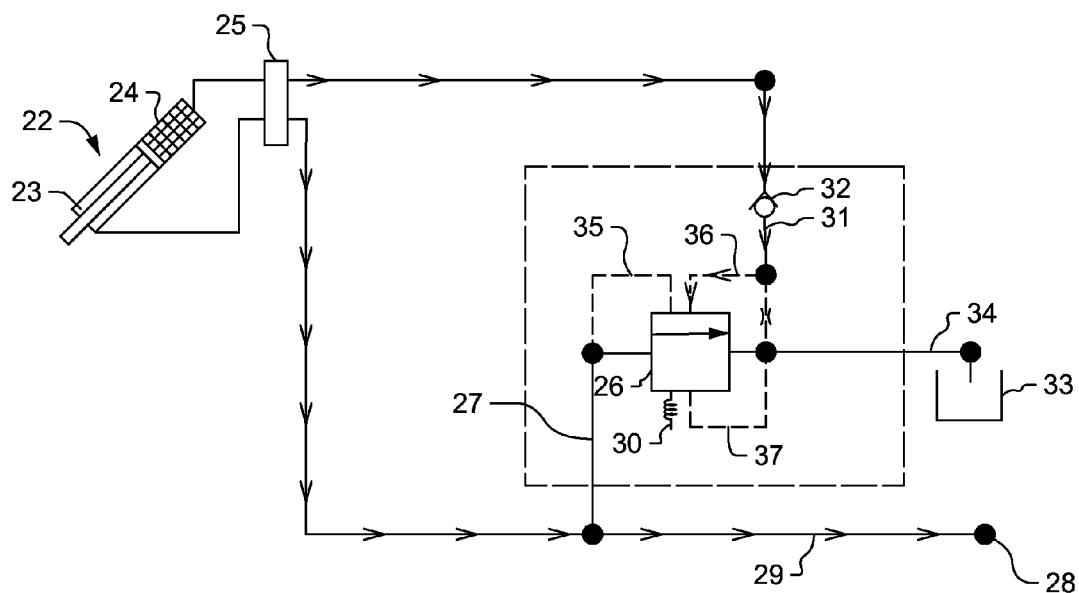
FIG. 7 is a schematic diagram illustrating the hydraulic flow path when the unloading relief valve is in the unloading mode without hoist valve rod end fluid flowing to the tank of FIG. 6, in accordance with the teachings of the present disclosure.

As illustrated in FIG. 6, the unloading relief valve 26 is shown in an unloading mode without the rod end 23 fluid flowing to the tank 33. The arrowed lines of FIG. 7 illustrate the fluid flow path associated with the unloading relief valve 26 depicted in FIG. 6. In the unloading mode without the rod end 23 fluid flowing to the tank 33, pilot pressure from the head end 24 is applied through the unloading relief valve 26 via the check valve 32. As a result, the head end 24 pilot pressure flows through the axial adapter passage 76 to the axial plug passage 74 via the at least one radial adapter passage 72. From the axial plug passage 74 the head end 24 pilot pressure flows through the at least one radial trunk passage 58 to the at least one actuating passage 56 via the axial trunk passage 60. The head end 24 pilot pressure then flows into the actuator chamber 80 and against the wall side 86 of the unloading actuator 84 forcing the unloading actuator 84 away from the wall 82 toward the actuator seat 64.

As the unloading actuator 84 moves towards the actuator seat 64, the snap ring seat 96 of the unloading actuator 84 engages the snap ring 94 of the stem 92 pulling the stem 92 towards the actuator seat 64. With the stem 92 moving towards the actuator seat 64, the retainer 98, also moving in the same direction, compresses the biasing member 30. The poppet 104 remains seated in operative sealing engagement with the poppet seat 44 such that the retainer 98 is disengaged from the poppet 104. The unloading actuator 84 will eventually come to rest against the actuator seat 64, as depicted in FIG. 6. In this position, a portion of the head end 24 pilot pressure accumulated in the actuator chamber 80 may leak around the unloading actuator 84 to the at least one radial stem passage 108 via the axial stem passage 106. From there, the head end 24 pilot pressure leakage flows out to the tank 33 through the first at least one radial body passage 112 via the biasing member chamber 110. With the poppet 104 remaining in operative sealing engagement with the poppet seat 44, the rod end 23 fluid is precluded from flowing to the tank 33 and instead flows to the brake cooling system 28.

Figure 8:
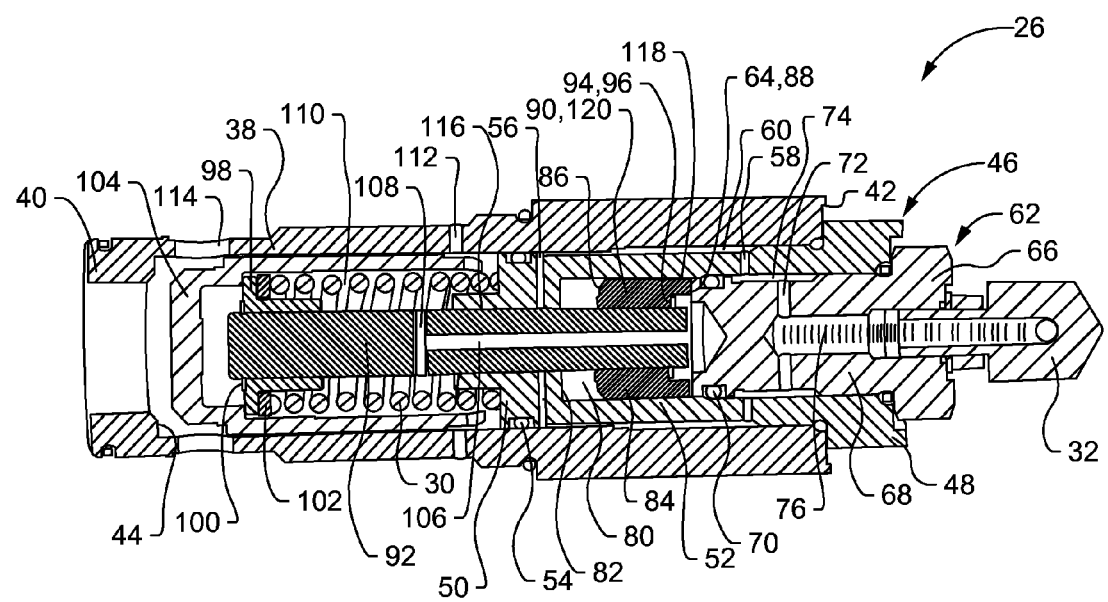
FIG. 8 is a sectional view of the unloading relief valve in an unloading mode with hoist valve rod end fluid flowing to the tank, in accordance with the teachings of the present disclosure.
Figure 9:
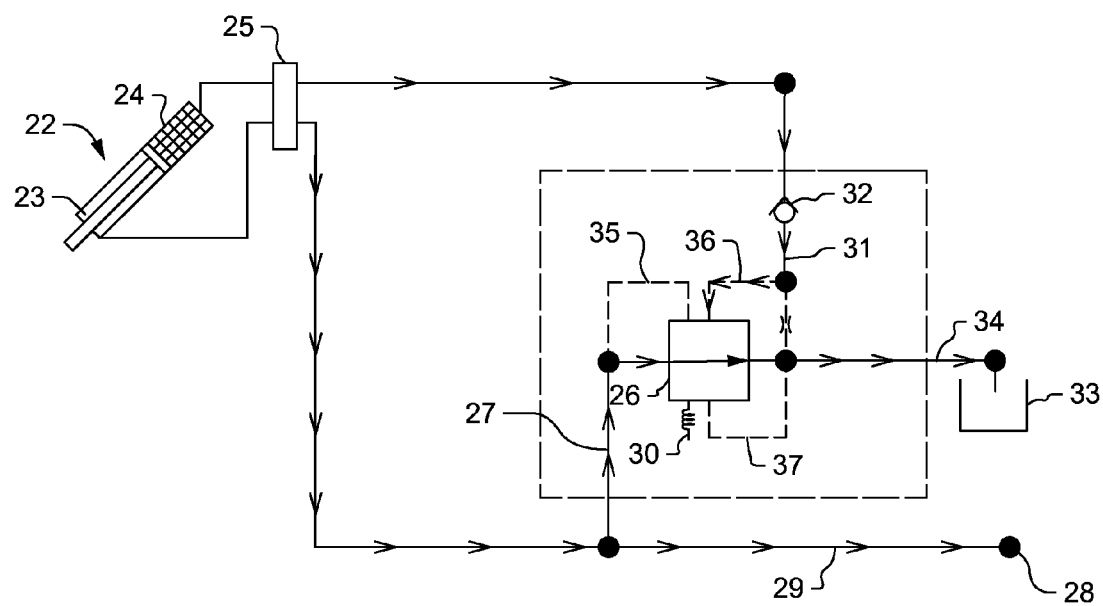
FIG. 9 is a schematic diagram illustrating the hydraulic flow path when the unloading relief valve is in the unloading mode with hoist valve rod end fluid flowing to the tank of FIG. 8, in accordance with the teachings of the present disclosure.

As illustrated in FIG. 8, the unloading relief valve 26 is shown in an unloading mode with the rod end 23 fluid flowing to the tank 33. The arrowed lines of FIG. 9 illustrate the fluid flow path associated with the unloading relief valve 26 depicted in FIG. 8. The head end 24 pilot pressure flows the same as described above in regards to the unloading relief valve 26 depicted in FIG. 6. The unloading relief valve 26 of FIG. 8 differs from FIG. 6 in that the rod end 23 fluid pressure also flows through the unloading relief valve 26. In particular, the rod end 23 fluid pressure flows against the poppet 104 and forces the poppet 104 away from the poppet seat 44 towards the retainer 98, which is compressing the biasing member 30 by way of the unloading actuator 84. With the poppet 104 unseated from the poppet seat 44, the rod end 23 fluid pressure flows through the second at least one radial body passage 114 to the tank 33.

Figure 10:
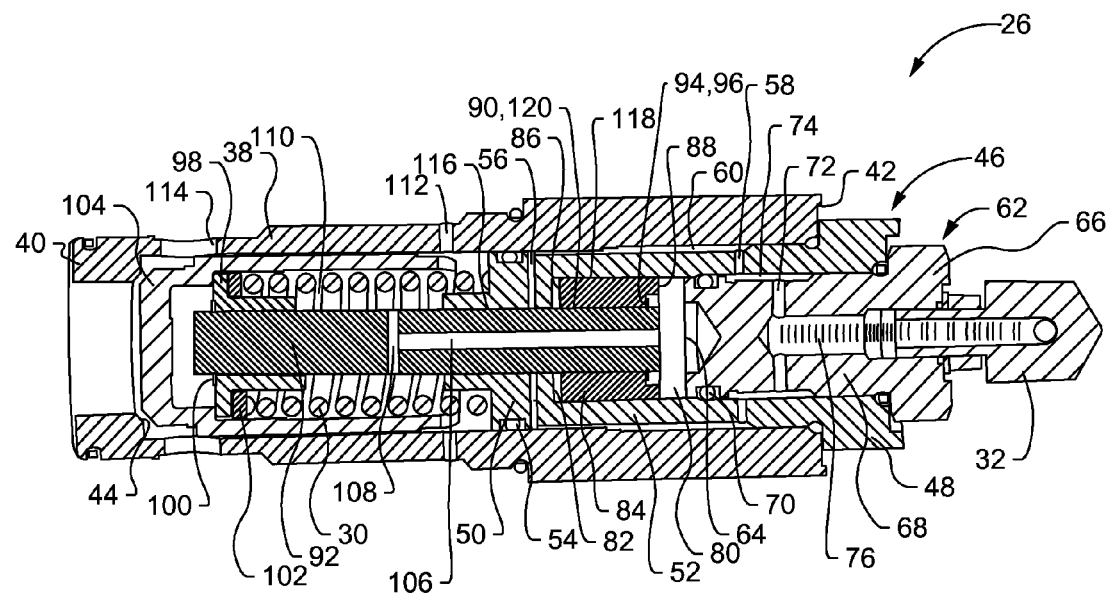
FIG. 10 is a sectional view of the unloading relief valve in mid-transition from the unloading mode with the hoist valve rod end fluid flowing to the tank back to the brake cooling relief mode, in accordance with the teachings of the present disclosure.
Figure 11:
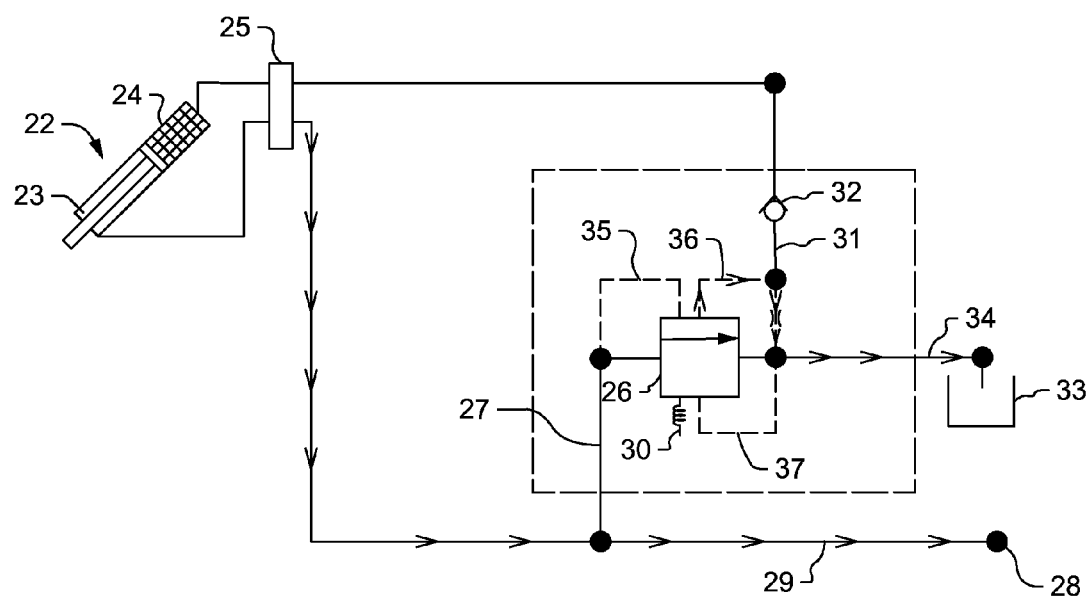
FIG. 11 is a schematic diagram illustrating the hydraulic flow path when the unloading relief valve is transitioning from the unloading mode with the hoist valve rod end fluid flowing to the tank back to the brake cooling relief mode, in accordance with the teachings of the present disclosure.

As illustrated in FIG. 10, the unloading relief valve 26 is shown in mid-transition from the unloading mode with the rod end 23 fluid flowing to tank 33 of FIG. 8 back to the brake cooling relief mode of FIG. 3. The arrowed lines of FIG. 11 illustrate the fluid flow path associated with the unloading relief valve 26 depicted in FIG. 10. In the transition back to the brake cooling relief mode, the head end 24 pilot pressure is removed from the unloading relief valve 26 and the rod end 23 fluid pressure is removed against the poppet 104 as well. As such, the pressurized head end 24 fluid remains in the flow path between the unloading actuator 84 and the check valve 32, but will slowly drain to the tank 33 as a result of the designed fits between components as described below. In particular, the unloading relief valve 26 may include a first axial extending fit 116 between the stem 92 and both the wall 82 and the collar portion 50 of the plug 46. A second axial extending fit 118 may be between the unloading actuator 84 and the trunk portion 52 in the actuator chamber 80. A third axial extending fit 120 may be between the center bore 90 of the unloading actuator 84 and the stem 92. The first axial extending fit 116 may be less than the second axial extending fit 118 and the second axial extending fit 118 may be less than the third axial extending fit 120. The first axial extending fit 116 may be in the approximate range of 6 μm to 13 μm. The second axial extending fit 118 may be in the approximate range of 20 μm to 28 μm. The third axial extending fit 120 may be in the approximate range of 40 μm to 50 μm.

Without the head end 24 pilot pressure being applied, the first through third axial extending fits 116, 118, 120 collectively allow the pressurized head end 24 fluid, disposed between the unloading actuator 84 and the check valve 32, to leak through the axial extending fits 116, 118, 120 to the tank 33 so that the unloading actuator 84 slowly returns back to a resting position against the wall 82 in a controlled manner to prevent a new or extra pressure from being introduced into the brake cooling system 28. With the pressurized head end 24 fluid leaking through the first through third axial extending fits 116, 118, 120 and the unloading actuator 84 slowly returning to the wall 82, the biasing member 30 slowly decompresses and urges the retainer 98 to force the poppet 104 back into sealing engagement with the poppet seat 44.

Figure 12:
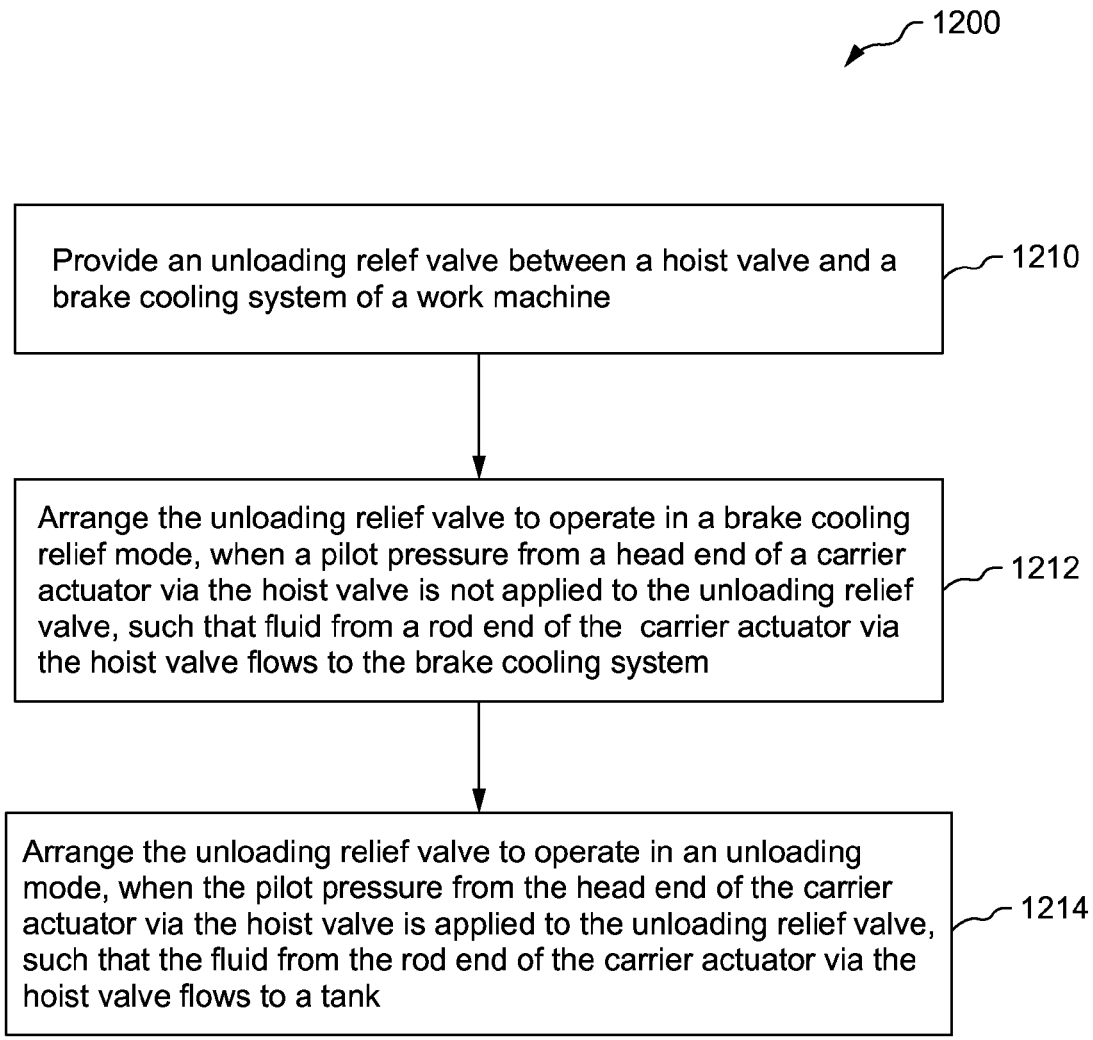
FIG. 12 is a flow chart illustrating a sample sequence of steps which may be practiced in accordance with the teaching of the present disclosure.

FIG. 12 illustrates a flowchart 1200 of a sample sequence of steps which may be performed to prevent transient pressure spikes into a brake cooling system of a work machine. Box 1210 shows the step of providing the unloading relief valve 26 between a hoist valve 25 and a brake cooling system 28 of the work machine 10. Another step as illustrated in box 1212 is arranging the unloading relief valve 26 to operate in a brake cooling relief mode, when a pilot pressure from the head end 24 of a carrier actuator 22 via the hoist valve 25 is not applied to the unloading relief valve 26, such that fluid from a rod end 23 of the carrier actuator 22 via the hoist valve 25 flows to the brake cooling system 28. Box 1214 depicts the step of arranging the unloading relief valve 26 to operate in an unloading mode, when the pilot pressure from the head end 24 of the carrier actuator 22 via the hoist valve 25 is applied to the unloading relief valve 26, such that the fluid from the rod end 23 of the carrier actuator 22 via the hoist valve 25 flows to the tank 33. The unloading relief valve 26, when operating in the brake cooling relief mode, may be arranged to allow a transient pressure spike in the brake cooling system 28 to flow to the tank 33. The unloading relief valve 26 may be arranged to transition from the unloading mode to the brake cooling mode in a controlled manner to prevent an extra pressure from being introduced into the brake cooling system 28. The unloading relief valve 26 may be arranged to continue functioning in a brake cooling mode during an unloading mode failure. The unloading relief valve 26 may be retrofitted between the hoist valve 25 and the brake cooling system 28.

INDUSTRIAL APPLICABILITY

Based on the foregoing, it can be seen that the present disclosure sets forth systems and methods for preventing transient pressure spikes into a brake cooling system of a work machine. For example, the unloading relief valve 26 may operate in the brake cooling relief mode such that the biasing member 30 biases the poppet 104 in sealing engagement with the poppet seat 44 precluding the fluid from the rod end 23 from flowing to the tank 33. Accordingly, the fluid from the rod end 23 may flow to the brake cooling system 28. During a raise command of the hoist valve 25, the rod end 23 dispels a large amount of fluid towards the brake cooling system 28, which needs to flow to the tank 33. As such, the unloading relief valve 26 may operate in the unloading mode such that a pilot pressure from the head end 24 causes the unloading actuator 84 to compress the biasing member 30. With the biasing member 30 disengaged from the poppet 104, there is no longer a force biasing the poppet 104 against the poppet seat 44. As a result, the fluid from the rod end 23 forces the poppet 104 towards the plug 46 and continues to flow through the second at least one radial body passage 114 to the tank 33. Accordingly, duo cone seals in the brake cooling system 28 are not exposed to the large fluid pressure spikes from the rod end 23 and the life span of the duo cone seals may be increased.

Further, during a lower command of the hoist valve 25, the pilot pressure from the head end 24 is no longer applied and the rod end 23 fluid pressure is no longer applied against the poppet 104, so that the unloading relief valve 26 slowly transitions back to the brake cooling relief mode from the unloading mode. Although the pilot pressure is no longer applied to the unloading relief valve 26, a portion of the pilot pressure fluid remains in the flow path between the unloading actuator 84 and the check valve 32 and slowly drains through the fits 116, 118, 120 to the tank 33. This controlled slow transition from the unloading mode to the brake cooling relief mode ensures that a new pressure is not introduced into the brake cooling system 28.

The teachings of this disclosure can be retrofitted into brake cooling systems of existing work machines. Moreover, through the novel teaching set forth above, brake cooling system components such as, but not limited to, duo cone seals may experience longer life spans, which results in reduced work machine downtime due to repairs.

What is claimed is:

1. A valve for a brake cooling system, the valve comprising:
    a body including a first end, a second end, a first at least one radial passage, and a second at least one radial passage fluidly communicable with the first end;
    a first seat disposed within the body proximate the first end;
    a plug including a stop, a collar, and a first trunk disposed between the stop and the collar, the collar and the first trunk disposed in the body;
    an adapter including a second seat, a head, and a second trunk disposed between the second seat and the head, the second seat and the second trunk disposed in the plug;
    a chamber defined in the first trunk of the plug, the chamber fluidly communicable with the adapter and the first at least one radial passage;

an actuator slidably disposed in the chamber;
a biasing member in operative association with the actuator; and
a poppet in operative association with the biasing member and the first seat.

2. The valve of claim 1, further including a check valve in fluid communication with the adapter.

3. The valve of claim 1, further including a stem in operative association with the actuator, the collar of the plug, and the biasing member, the stem penetrating through the collar and a bore of the actuator.

4. The valve of claim 3, further including a first fit between the stem and the collar, a second fit between the actuator and the chamber, and a third fit between the stem and the actuator.

5. The valve of claim 4, wherein the first fit is less than the second fit and the second fit is less than the third fit.

6. The valve of claim 3, further including a retainer extending radially outwardly from the stem and a snap ring disposed on the stem, the retainer being in operative association with the biasing member and the poppet, the snap ring operatively engageable with the actuator.

7. The valve of claim 1, wherein the biasing member is disengageable from the poppet.

8. A work machine, the machine comprising:
a carrier including a rod end and a head end;
a valve including a body, the body including a first end, a second end, a first at least one radial passage, and a second at least one radial passage fluidly communicable with the first end, the first end fluidly communicable with the rod end;
a first seat disposed within the body proximate the first end;
a plug including a stop, a collar, and a first trunk disposed between the stop and the collar, the collar and the first trunk disposed in the body;
an adapter including a second seat, a head, and a second trunk disposed between the second seat and the head, the second seat and the second trunk disposed in the plug;
a chamber defined in the first trunk of the plug, the chamber fluidly communicable with the adapter and the first at least one radial passage;
an unloading actuator slidably disposed in the chamber;
a biasing member in operative association with the unloading actuator;
a poppet in operative association with the biasing member and the first seat; and
a check valve disposed in the adapter and fluidly communicable with the head end.

9. The machine of claim 8, wherein the work machine is one of a mining truck and an off-highway truck.

10. The machine of claim 8, further including a stem in operative association with the unloading actuator, the collar of the plug, and the biasing member, the stem penetrating through the collar and a bore of the unloading actuator.

11. The machine of claim 10, further including a first fit between the stem and the collar, a second fit between the unloading actuator and the chamber, and a third fit between the stem and the unloading actuator.

12. The machine of claim 11, wherein the first fit is less than the second fit and the second fit is less than the third fit.

13. The machine of claim 10, further including a retainer extending radially outwardly from the stem and a snap ring disposed on the stem, the retainer being in operative association with the biasing member and the poppet, the snap ring operatively engageable with the unloading actuator.

14. The machine of claim 8, wherein the biasing member is disengageable from the poppet.

15. The machine of claim 8, wherein the first at least one radial passage and the second at least one radial passage are both in fluid communication with a tank, the first end being fluidly communicable with the tank via the second at least one radial passage.

* * * * *